US012722899B2

(12) United States Patent
Fitch et al.

(10) Patent No.: US 12,722,899 B2
(45) Date of Patent: Sep. 1, 2026

(54) COMBINATION CONVEYOR BELT AND METHOD OF MANUFACTURE

(71) Applicant: WEBSTER INDUSTRIES, INC., Tiffin, OH (US)

(72) Inventors: Shawn Fitch, Tiffin, OH (US); Shawn Shriver, Tiffin, OH (US); Kylene Foster, Tiffin, OH (US)

(73) Assignee: WEBSTER INDUSTRIES, INC., Tiffin, OH (US)

( * ) Notice: Subject to any disclaimer, the term of this patent is extended or adjusted under 35 U.S.C. 154(b) by 73 days.

(21) Appl. No.: 18/921,832

(22) Filed: Oct. 21, 2024

(65) Prior Publication Data

US 2025/0128887 A1 Apr. 24, 2025

Related U.S. Application Data

(60) Provisional application No. 63/591,826, filed on Oct. 20, 2023.

(51) Int. Cl.
*B65G 15/30* (2006.01)
*B65G 17/00* (2006.01)
(Continued)

(52) U.S. Cl.
CPC ........... *B65G 15/30* (2013.01); *B65G 17/002* (2013.01); *B65G 17/40* (2013.01); *B65G 37/005* (2013.01); *B65G 37/00* (2013.01)

(58) Field of Classification Search
CPC ...... B65G 17/40; B65G 15/30; B65G 17/002; B65G 37/00; B65G 37/005
(Continued)

(56) References Cited

U.S. PATENT DOCUMENTS 2,718,296 A * 9/1955 Johnson ............... B65G 41/002 198/836.3
2,809,742 A * 10/1957 Holz ...................... B65G 15/42 D34/29

(Continued)

FOREIGN PATENT DOCUMENTS

CN 207842792 U 9/2018
DE 4340132 A1 3/1995

(Continued)

OTHER PUBLICATIONS

Written Opinion of the International Searching Authority dated Mar. 5, 2025.

*Primary Examiner* — James R Bidwell
(74) *Attorney, Agent, or Firm* — Jacob M. Ward; Ward Law Office LLC

(57) ABSTRACT

A combination conveyor belt and method for manufacturing the same is provided. The conveyor belt includes a unique fastener system that serves to couple a skeleton, with stiffening members having apertures, to a belt disposed on the skeleton. The fastener system uses rivet nuts received in the apertures and deformed to secure them. Fasteners engage the rivet nuts through washers and belt holes to couple the belt to the stiffening members. The configuration and assembly of the combination conveyor belt improves service life, reduces maintenance, and lowers manufacturing costs by providing secure belt attachment. The method includes providing the skeleton and belt, and coupling them together with the fastener system. A kit for the conveyor belt is also disclosed, containing the skeleton components, belt, and fastener systems for assembly.

19 Claims, 9 Drawing Sheets

(51) Int. Cl.
*B65G 17/40* (2006.01)
*B65G 37/00* (2006.01)

(58) Field of Classification Search
USPC .................................................. 198/817, 849
See application file for complete search history.

(56) References Cited

U.S. PATENT DOCUMENTS

| | | | | |
|---|---|---|---|---|
| 2013/0026002 | A1 * | 1/2013 | Spangler | B65G 35/066 198/339.1 |
| 2021/0388861 | A1 | 12/2021 | Hanratty | |
| 2024/0240659 | A1 * | 7/2024 | Chalvet | F16B 5/0233 |

FOREIGN PATENT DOCUMENTS

| | | | | | |
|---|---|---|---|---|---|
| EP | 1717458 | A1 | * | 11/2006 | B60S 1/0447 |
| EP | 4095395 | B1 | | 7/2023 | |
| EP | 3926184 | B1 | * | 5/2024 | F16B 37/067 |

* cited by examiner

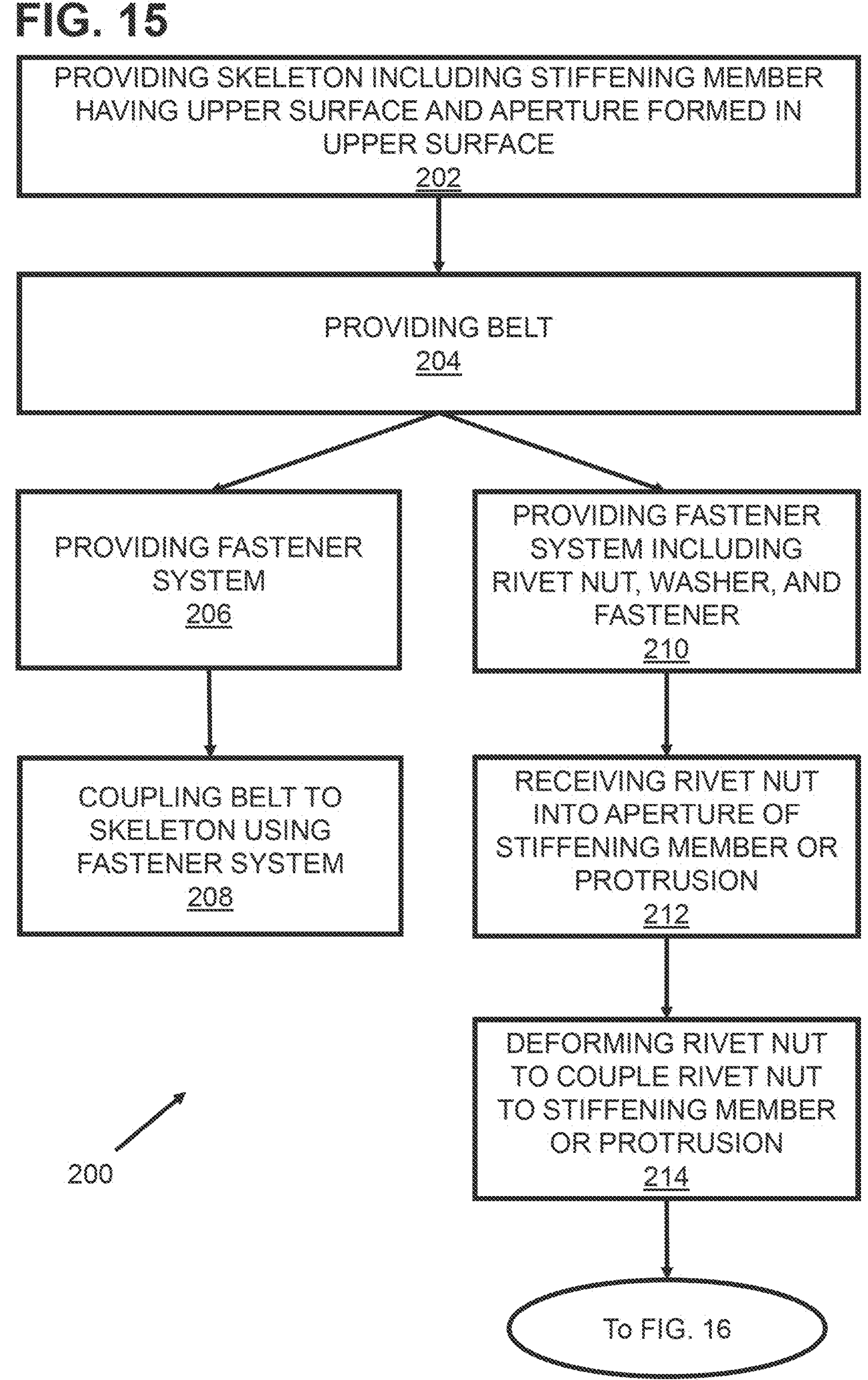
FIG. 15
PROVIDING SKELETON INCLUDING STIFFENING MEMBER HAVING UPPER SURFACE AND APERTURE FORMED IN UPPER SURFACE
202
PROVIDING BELT
204
PROVIDING FASTENER SYSTEM
206
PROVIDING FASTENER SYSTEM INCLUDING RIVET NUT, WASHER, AND FASTENER
210
COUPLING BELT TO SKELETON USING FASTENER SYSTEM
208
RECEIVING RIVET NUT INTO APERTURE OF STIFFENING MEMBER OR PROTRUSION
212
DEFORMING RIVET NUT TO COUPLE RIVET NUT TO STIFFENING MEMBER OR PROTRUSION
214
200
To FIG. 16

From FIG. 15
DISPOSING FASTENER THROUGH WASHER
216
DISPOSING FASTENER THROUGH BELT
218
ENGAGING FASTENER WITH RIVET NUT TO COUPLE BELT BETWEEN STIFFENING MEMBER OF SKELETON AND WASHER OF FASTENER SYSTEM
220
200

COMBINATION CONVEYOR BELT AND METHOD OF MANUFACTURE

CROSS-REFERENCE TO RELATED APPLICATIONS

This application claims the benefit of U.S. Provisional Application No. 63/591,826, filed on Oct. 20, 2023. The entire disclosure of the above application is hereby incorporated herein by reference.

FIELD

The present technology relates to material handling and, more specifically, to a conveyor belt for transporting items.

INTRODUCTION

This section provides background information related to the present disclosure which is not necessarily prior art.

Conveyors are components used in automated distribution and warehousing, as well as manufacturing and production facilities. They are widely used to transport items from one location to another. Conveyors typically consist of a flexible framework with an attached belt, which may be woven or made of another flexible material that contacts the items being moved. The items are placed on the belt and transported to the desired location as the belt moves.

Typically, conveyors are designed for a variety of service conditions and can be configured to efficiently handle specific types of items in different environments. For example, they may be used to transport small loose objects, powders, granular materials, packages, or combinations of these. Items can vary widely, from wet to dry, abrasive to delicate, and small to large, with weights ranging from light to very heavy. Many conveyor systems are also customizable, allowing manufacturers to adapt their design to specific industry needs, including factors like speed, load size, and environmental challenges.

Certain items, along with specific environmental or service conditions, can reduce service life or increase maintenance needs of a conveyor. Heavy items, or situations where items are dropped from a height onto the conveyor, are particularly problematic. These conditions can lead to wear and tear on both the belt and the framework. Repairing or replacing conveyors can be costly, and downtime can further increase expenses by disrupting equipment and processes that rely on the conveyor system.

Conveyors built to handle more demanding conditions often have higher manufacturing costs due to the need for more durable designs, stronger structural components, and additional hardware. Assembly costs are also higher because more components and hardware are required, increasing the complexity of the assembly process. In some cases, the increased upfront cost is offset by longer service life, as more robust systems can often handle heavier loads with less energy consumption over time.

There is a continuing need for a combination conveyor belt that has an improved service life, reduced maintenance requirements, and reduced cost of manufacturing.

SUMMARY

In concordance with the instant disclosure, a combination conveyor belt for transporting various items and that has an improved service life, reduced maintenance requirements, and reduced cost of manufacturing, has surprisingly been discovered.

The present technology includes articles of manufacture, systems, and processes that relate to a combination conveyor belt and method of manufacture. Specifically, the technology focuses on a secure attachment of a belt to a skeleton or pivoting framework of the combination conveyor belt, utilizing a fastener system that includes a rivet nut, a washer, and a fastener.

In one embodiment, a fastener system for a combination conveyor belt including a skeleton is provided. The fastener system includes a rivet nut having a lip, an opposing lip, an exterior, and a threaded through hole. The rivet nut is received in an aperture formed in the skeleton, with the lip and the opposing lip in frictional contact with the skeleton. The opposing lip is formed upon deformation of the rivet nut after it is received in the aperture, coupling the rivet nut to the skeleton. The fastener system also includes a fastener threadably received in the threaded through hole of the rivet nut coupled to the skeleton, securing one component of the combination conveyor belt to another component.

The fastener system may further include a washer disposed on and abutting the fastener. This washer can help distribute the load and prevent the fastener from pulling through the belt material. In particular embodiments, the rivet nut has a hexagonal cross-section, and the aperture of the skeleton has a corresponding hexagonal shape. This configuration helps minimize rotation of the rivet nut with respect to the skeleton. Additionally, the rivet nut is in frictional contact with the skeleton, further minimizing rotation.

The fastener system can be used to secure various components of the combination conveyor belt. In one configuration, the components being secured are a belt and a stiffening member of the skeleton, with the rivet nut coupled to the stiffening member. Alternatively, the components may be a stiffening member having a fastener hole and a protrusion formed on a chain of the skeleton, with the rivet nut coupled to the protrusion. This fastener system provides a secure attachment mechanism for the combination conveyor belt, contributing to improved service life, reduced maintenance requirements, and reduced manufacturing costs.

In another embodiment, a combination conveyor belt is provided. The combination conveyor belt can include a skeleton, a belt, and a fastener system. The skeleton can include a stiffening member having an upper surface and an aperture formed in the upper surface. The belt can be disposed on the upper surface of the stiffening member of the skeleton. The fastener system can be configured to cooperate with the aperture to couple the belt to the skeleton.

In a further embodiment, a method of manufacturing a combination conveyor belt is provided. The method of manufacturing can include coupling a belt to a skeleton using a fastener system, wherein the skeleton can include a stiffening member having an upper surface and an aperture formed in the upper surface. The belt can be disposed on the upper surface of the stiffening member of the skeleton, and the fastener system can cooperate with the aperture to couple the belt to the skeleton.

In an additional embodiment, a kit for use in assembly of a combination conveyor belt is provided. The kit can include a skeleton having a plurality of stiffening members. Each stiffening member can include an upper surface, and a plurality of apertures formed in the upper surface. The kit can further include a belt disposed on the upper surface of each stiffening member. The belt can include a plurality of holes corresponding to the plurality of apertures of each stiffening member. The kit can further include a plurality of fastener systems. Each fastener system can include a rivet nut, a washer, and a fastener. Each fastener system can be configured to have the rivet nut received in one aperture of the stiffening member and deformed. The fastener can be disposed through the washer and engage the rivet nut, thereby coupling the belt to the stiffening member with the belt disposed between the washer and the stiffening member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 15 is a flow chart illustrating a method of manufacturing a combination conveyor belt, according to one embodiment of the present disclosure.

DETAILED DESCRIPTION

Figures 1, 2:
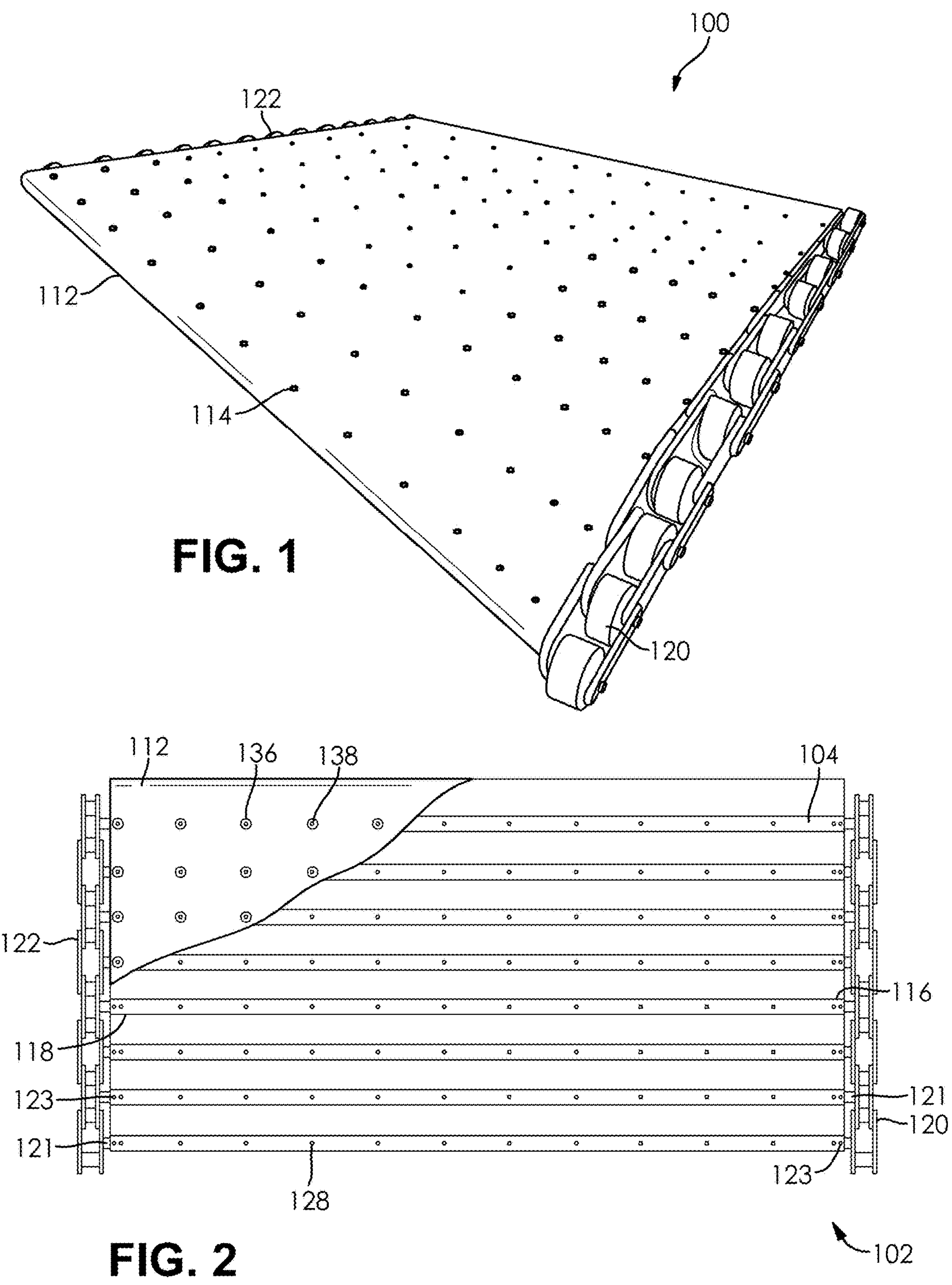
FIG. 1 is a top perspective view of a combination conveyor belt showing a belt coupled to a portion of the combination conveyor belt, according to one embodiment of the present disclosure.
FIG. 2 is a top plan view of the combination conveyor belt, according to the embodiment shown in FIG. 1.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of" Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology relates to a combination conveyor belt 100 (FIGS. 1-14) and a method 200 (FIGS. 15-16) for manufacturing the same, including a fastener system 114, shown generally according to certain embodiments in FIGS. 1-14. The present technology improves material handling by addressing certain challenges in the design of conveyor belts. Advantageously, the conveyor belt can provide an improved service life, reduced maintenance requirements, and reduced cost of manufacturing for a given application by providing for a secure attachment of a belt to a skeleton or pivoting framework of the combination conveyor belt. Furthermore, an improved method of manufacturing a combination conveyor belt is provided that can utilize a fastener system that can include a rivet nut, a washer, and a fastener to facilitate the secure attachment of the belt to the skeleton while eliminating a need to hold and militate against a rotation of the rivet nut with an assembly tool or one's fingers, for example, while assembling or maintaining the combination conveyor belt 100.

With reference to FIGS. 1-4, the combination conveyor belt 100 can include a pivoting framework or skeleton 102. The skeleton 102 can include a stiffening member 104 having a first end 116, a second end 118, and an upper surface 106. An aperture 110 can be formed in the upper surface 106 of the stiffening member 104. It should be understood that the aperture 110 can have various cross-sectional shapes, including round and polygonal, including hexagonal, triangular, square, pentagonal, and any other geometrical shape, as desired.

Figure 5:
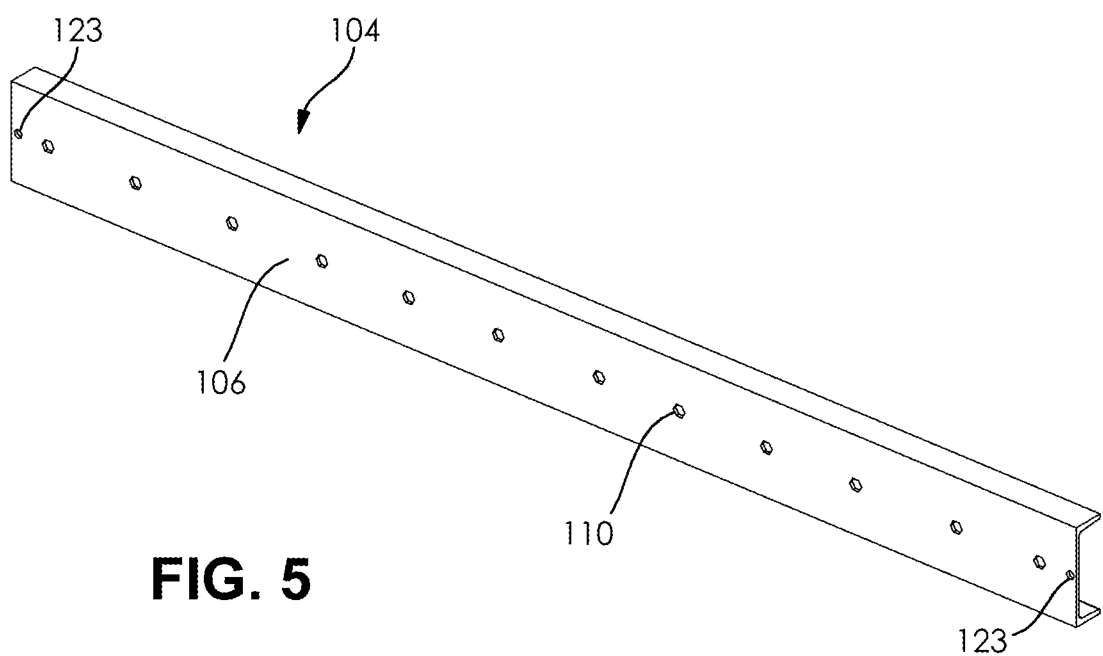
FIG. 5 is a top perspective view of a stiffening member of the combination conveyor belt, according to another embodiment of the present disclosure.
Figure 6:
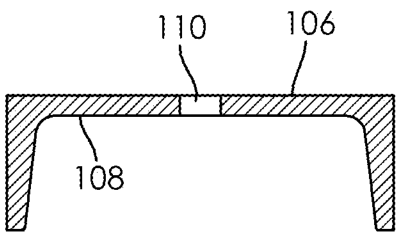
FIG. 6 is a cross-sectional side elevational view of the stiffening member of the combination conveyor belt, according to the embodiment shown in FIG. 5.

In the illustrated embodiment, the stiffening member 104 can be formed from steel tubing having a substantially square-shaped cross-section. One of ordinary skill in the art will understand that other materials and shapes can be used for the stiffening member 104 as desired and as necessary to satisfy specific design, manufacturing, and application requirements such as, for example, materials having substantially C-shaped cross-section, as shown in FIGS. 5-6, as well as round tubing, and solid steel bars.

Figure 3:
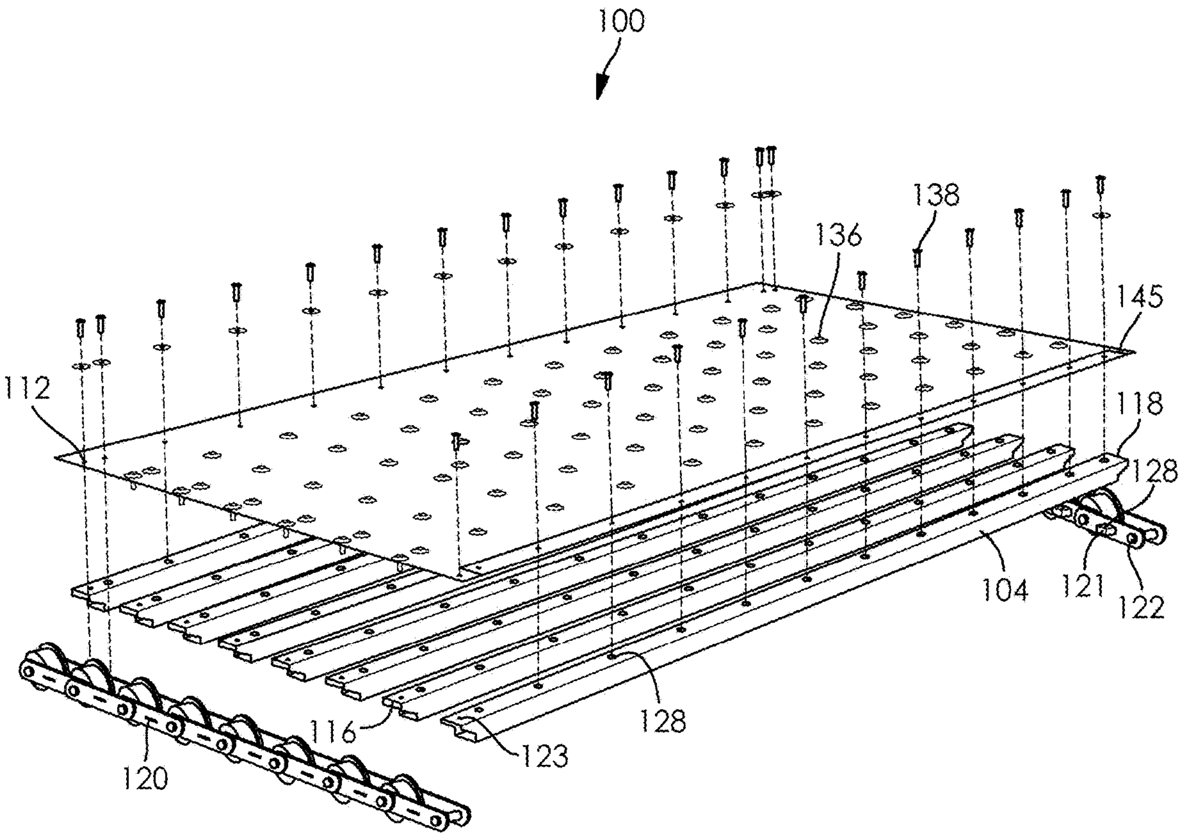
FIG. 3 is an exploded perspective view of the combination conveyor belt, according to the embodiment shown in FIG. 1.
Figure 4:
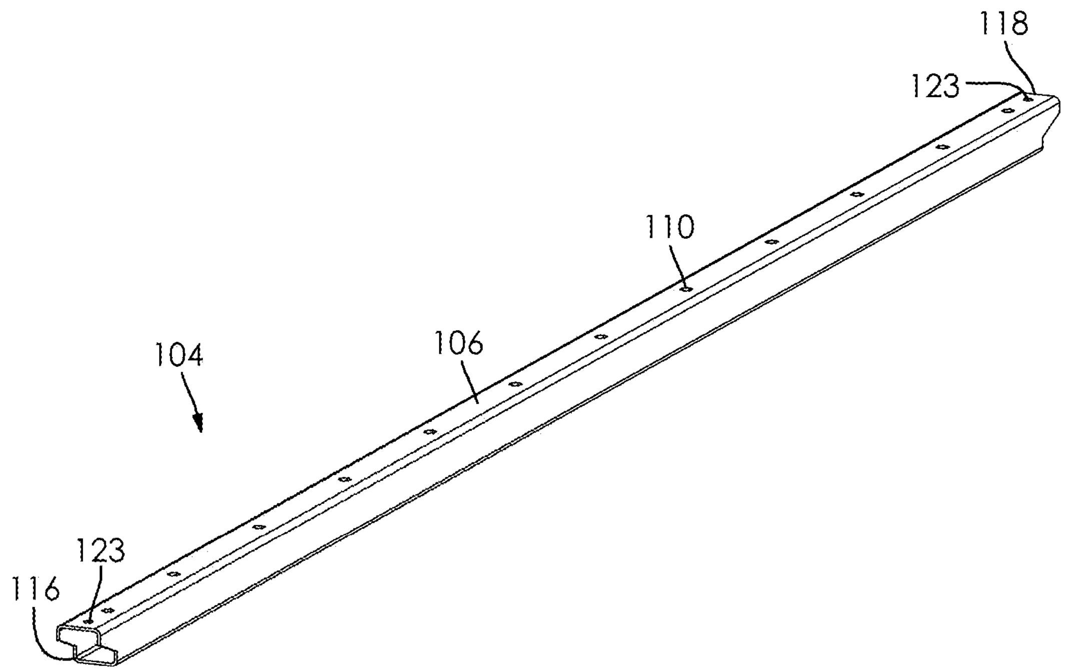
FIG. 4 is a top perspective view of a stiffening member of the combination conveyor belt, according to the embodiment shown in FIG. 1.

With reference to FIGS. 2 and 3, the stiffening member 104 can be disposed between a first chain 120 and a second chain 122 where the first end 116 of the stiffening member 104 can be coupled to the first chain 120 and the second end 118 of the stiffening member 104 can be coupled to the second chain 122. A protrusion 121 can be formed on the first chain 120 and the second chain 122. The protrusions 121 can extend inwardly toward a longitudinal centerline of the conveyor belt 100 and also include one of the apertures 110 therein. The first end 116 and the second end 118 of the stiffening member 104 can each include a fastener hole 123 to facilitate joining the first end 116 and the second end 118 of the stiffening member 104 to the protrusions 121 formed on the first chain 120 and the second chain 122.

Figure 7:
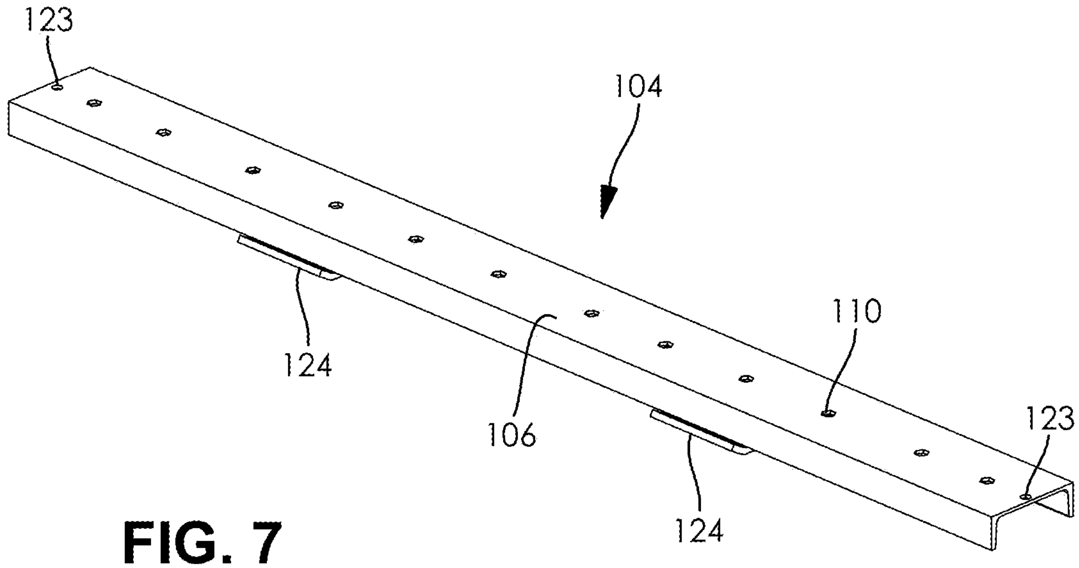
FIG. 7 is a top perspective view of a stiffening member including a wear pad of the combination conveyor belt, according to another embodiment of the present disclosure.
Figure 8:
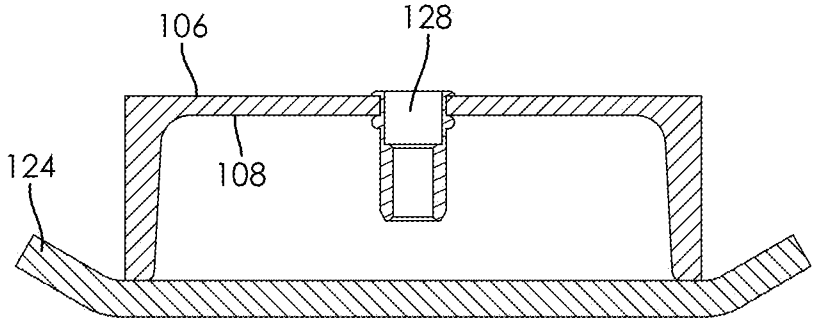
FIG. 8 is a cross-sectional side elevational view of the stiffening member including a wear pad of the combination conveyor belt, according to the embodiment shown in FIG. 7.

In some embodiments, and with particular reference to FIGS. 7 and 8, the stiffening member 104 can include a wear pad 124. The wear pad 124 can be configured to protect the stiffening member 104 from excessive wear due to friction and impact with a wear rail (not shown). The wear pads 124 can act as a buffer between the stiffening members 104 as well as other structural components of the conveyor belt 100. For example, a stiffening member 104 with a wear pad 124 traveling in one direction can slide over another stiffening member 104 with a wear pad 124 traveling in an opposite direction. Wear pads 124 can be made from steel for example. The wear rail which is not shown can be made from a low-friction, durable materials like ultra-high-molecular-weight polyethylene (UHMW), rubber, or other engineered plastics. These materials have a naturally smooth surface with a low coefficient of friction.

With reference to FIGS. 2 and 3, the skeleton 102 can include a plurality of the stiffening members 104 coupled to the first chain 120 and the second chain 122. The stiffening members 104 can be spaced apart from each other. The skeleton 102 can form a loop that can be disposed on a rail system and sprockets. The loop can be driven in an endless loop to provide movement to the combination conveyor belt 100.

Figure 9:
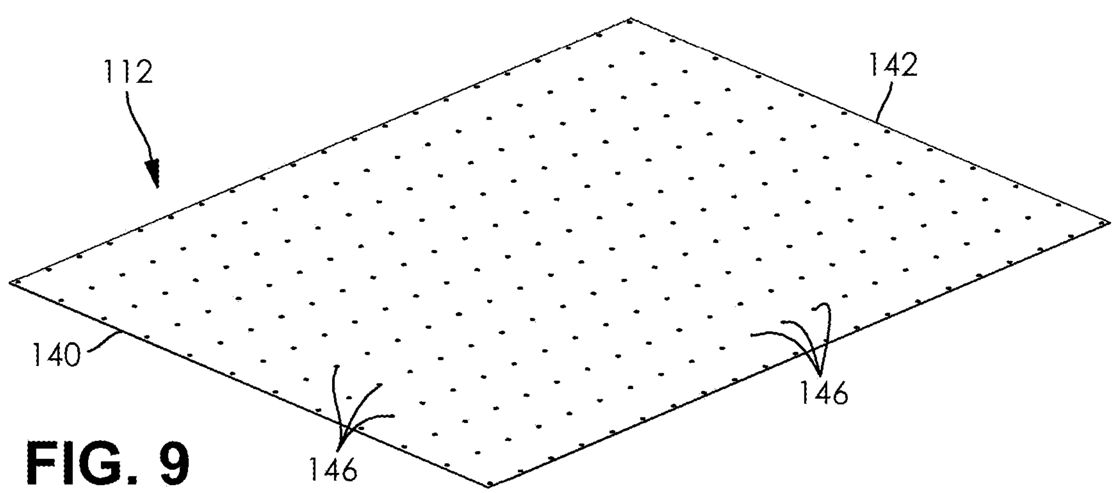
FIG. 9 is a top perspective view of the belt of the combination conveyor belt, according to the embodiment shown in FIG. 1.
Figure 10:
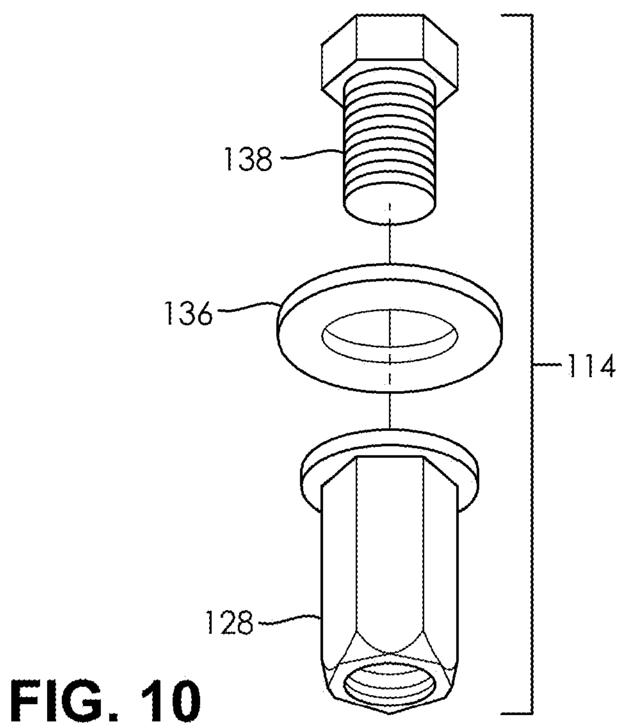
FIG. 10 is a perspective view of a fastener system of the combination conveyor belt, according to the embodiment shown in FIG. 1.

As shown in FIG. 9, the combination conveyor belt 100 can further include a belt 112 having a hole 146 formed therein. Advantageously, the fastener system 114 of the present disclosure can be used to secure the belt 112 to the stiffening member 104 of the skeleton 102. Furthermore, the fastener system 114 can be used to secure the stiffening members 104 to the protrusions 121 of the first chain 120 and the second chain 122. The fastener system 114, shown in FIG. 10, can include a rivet nut 128, a washer 136, and a fastener 138. The rivet nut 128 can be configured to be received in the apertures 110 of the stiffening member 104 and the protrusions 121 to facilitate coupling the belt 112 to the stiffening member 104 of the skeleton 102 and the stiffening members 104 to the protrusions 121 of the first chain 120.

Figure 11:
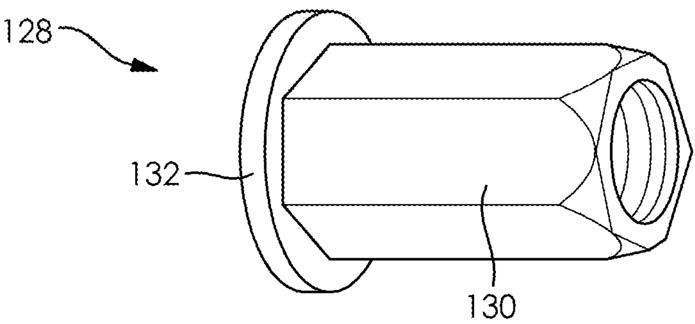
FIG. 11 is a perspective view of a rivet nut of the combination conveyor belt, according to the embodiment shown in FIG. 1.

The fit of the rivet nut 128 in the aperture 110 can be an interference fit to mitigate against a rotation of the rivet nut 128 and prevent removal with respect to the stiffening member 104 and the protrusions 121. With reference to FIG. 11, the rivet nut 128 can include a hexagonal cross-sectional shape to engage the hexagonal shape of the aperture 110. In the illustrated embodiment, the rivet nut 128 can include a plurality of flat surfaces 130 meant to contact a peripheral wall of the aperture 110. It should be understood that an adhesive or other joint dressing can be utilized to facilitate the insertion and retention of the rivet nut 128 in the aperture 110.

Figure 12:
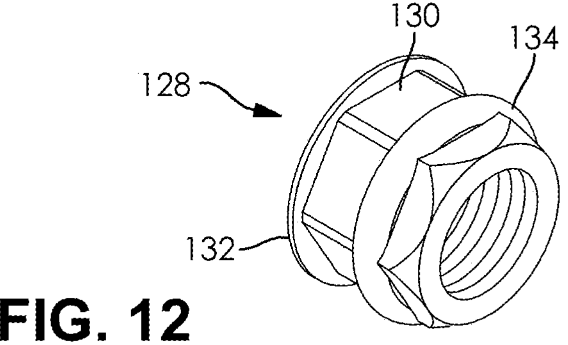
FIG. 12 is a perspective view of a deformed rivet nut of the combination conveyor belt, according to an embodiment shown in FIG. 1.
Figure 13:
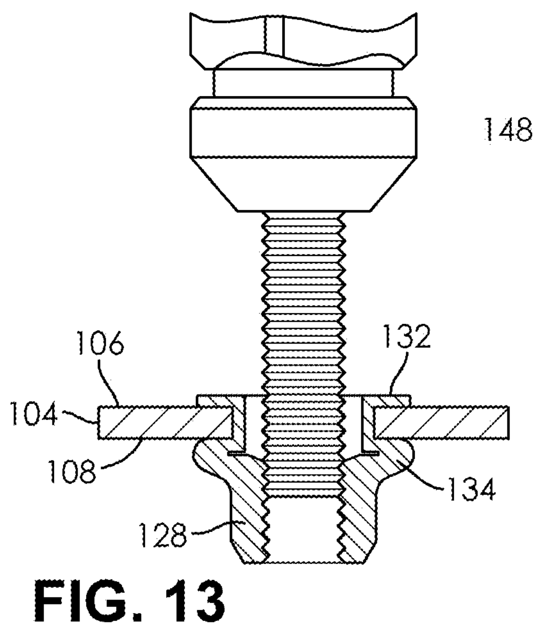
FIG. 13 is a cross-sectional side view of the stiffening member and a deformed rivet nut and a tool, according to an embodiment shown in FIG. 1.
Figure 14:
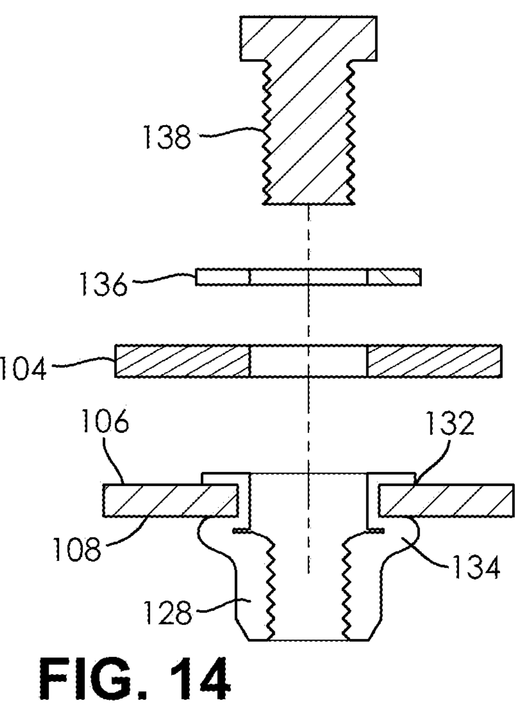
FIG. 14 is a cross-sectional side view of a fastener, a washer, the belt, and the deformed rivet nut of the combination conveyor belt, according to an embodiment shown in FIG. 1.

With continued reference to FIG. 11, the rivet nut 128 can include a lip 132 that provides an outer diameter of the rivet nut 128 that is greater than the diameter and/or size of the aperture 110. The lip 132 can abut the upper surface 106 of the stiffening member 104 and/or the protrusions 121 and mitigate against the rivet nut 128 from passing through the aperture 110. As shown in FIGS. 12 and 13, the rivet nut 128 can be deformed using a tool 148, shown in FIG. 13, such as such an electric or pneumatic press or riveting gun, for example, to create an opposing lip 134 that abuts an opposing surface 108 of the stiffening member 104 to secure the rivet nut 128 in the aperture 110 of the stiffening member 104. In this configuration, a wall of the stiffening member 104 is disposed between the lip 132 and the opposing lip 134 of the deformed rivet nut 128 to militate against removal. Similarly, the rivet nut 128 can be disposed in the aperture 110 formed in the protrusion 121 and deformed using the tool 148, shown in FIG. 13, such as such an electric or pneumatic press or riveting gun, for example, to create the opposing lip 134 where a wall of the protrusion 121 is disposed between the lip 132 and the opposing lip 134 of the deformed rivet nut 128 to prevent removal. It should be appreciated that the rivet nut 128 can be coupled to a square tube or other closed hollow structural member where access to the hollow interior to secure the nut with a tool or one's fingers to militate against a rotation of the rivet nut 128 is limited.

In some embodiments, it should be understood that the rivet nut 128 can have a generally round cross-sectional shape where splines are formed on an exterior surface of the rivet nut 128, and the aperture 110 can be round to accommodate the round rivet nut. The splines can be configured to engage a surface of the peripheral wall of the aperture and militate against a rotation of the rivet nut 128 with respect to the stiffening member 104. It should be understood that the rivet nut 128 can have other cross-sectional shapes such as triangular, square, pentagonal, and any other geometrical cross-sectional shape, as desired, to militate against a rotation of the rivet nut 128 with respect to the stiffening member 104.

It should be understood that a diameter of the aperture 110 can be selected to cooperate with an outer diameter of the rivet nut 128 to form the desired interference fit of the rivet nut 128. The interference fit of the rivet nut 128 can mitigate against the rotation of the rivet nut 128 with respect to the stiffening member 104 when subject to a torque such as the torque utilized to threadably engage the fastener 138 with the rivet nut 128. For example, in certain embodiments, it can be desirable to apply a tightening torque of about 20 ft/lbs to about 60 ft/lbs or greater to the fastener 138 without causing a rotation of the rivet nut 128. In a particular example it may be desirable to apply a tightening torque of about 30 ft/lbs. The interference fit of the rivet nut 128 in the aperture 110 eliminates a need to secure the rivet nut 128 with one's fingers, an assembly tool such as a wrench, or an assembly fixture, for example.

With reference to FIG. 9, the belt 112 can include one or more holes 146 formed therein. Each hole 146 can be formed by a drilling, a punching, and any other suitable process for forming a hole therethrough. Each hole 146 can be formed at a location that is in substantial axial alignment with the apertures 110 and/or the fastener hole 123 of the stiffening member 104 when the belt 112 is disposed on the skeleton 102. The fastener 138 can be configured to be inserted through the washer 136 and the hole 146 of the belt 112 to engage the rivet nut 128 and couple the belt 112 between the stiffening member 104 of the skeleton 102 and the washer 136 of the fastener system 114. Additionally, the fastener 138 can be configured to be inserted through the washer 136, the hole 146 of the belt 112, and the fastener hole 123 to engage the rivet nut 128 disposed in the protrusion 121 (as shown in FIGS. 2 and 3) to couple the belt 112 between the stiffening member 104 of the skeleton 102 and the washer 136 of the fastener system 114 and to couple the stiffening member 104 to the protrusion 121. It should also be understood that in certain embodiments the belt 112 can be narrower than the stiffening member 104 and the fastener 138 can be used with or without the washer 136 and inserted through the fastener hole 123 to engage the rivet nut 128 disposed in the protrusion 121 to couple to couple the stiffening member 104 to the protrusion 121.

In certain embodiments, the fastener 138 can be inserted through the washer 136, one of the holes 146 adjacent the first end 140 of the belt 112, and one of the holes 146 adjacent the second end 142 of the belt 112 to engage the rivet nut 128 to couple the belt splice to the stiffening member 104 of the skeleton 102.

With reference to FIGS. 1, 2, 3 and 9, the belt 112 can be disposed on the skeleton 102 of the combination conveyor belt 100. The belt 112 can include a first end 140 and a second end 142. The belt can be sized to substantially cover a width and length of the skeleton 102. In certain embodiments, a width of the belt 112 can be substantially the same as a length of the stiffening members 104, thereby spanning the stiffening members 104.

Additionally, in certain embodiments, a length of the belt 112 can be longer than a length of the first chain 120 and the second chain 122 to provide for a belt splice where the first end 140 and the second end 142 of the belt 112 can overlap and can be coupled together. The belt splice can be located at the stiffening member 104. In certain embodiments, a plurality of belt sections or panels (not shown) can be provided. The plurality of belt sections can form the belt 112 that is longer than a length of the first chain 120 and the second chain 122. In such a configuration, the belt 112 can include a belt splice between adjacent ones of the plurality of belt sections where an end of one belt section overlaps an end of another belt section.

In certain embodiments, the belt 112 can include a belt splice bar 145, as shown in FIG. 3. The belt splice bar 145 can be configured to be the width of the belt 112, the width of the stiffening member 104, or some other length that is less than the distance between the chains 120, 122. The belt splice bar 145 can further be configured with apertures formed at a location that is in substantial axial alignment with the aperture 110 of the stiffening member 104 when the belt 112 is disposed on the skeleton 102. The belt splice bar 145 can sandwich the belt splice causing it to be secured to the stiffening member 104.

In the illustrated embodiment, the rivet nut 128 can be an internally threaded nut and the fastener 138 is an externally threaded bolt where the respective threads cooperate to create a threaded engagement therebetween and create a compressive force for coupling the belt 112 between the stiffening member 104 of the skeleton 102 and the washer 136. It should be understood that the interference fit of the rivet nut 128 in the aperture 110 and the engagement of the lip 132 and the opposing lip 134 with the stiffening member 104 is such to permit the tightening of the fastener 138 to a desired torque without causing a rotation of the rivet nut 128 and without the need to hold the rivet nut 128 stationary with an assembly tool or one's fingers.

Furthermore, it should be understood that the interference fit of the rivet nut 128 in the aperture 110 and the engagement of the lip 132 and the opposing lip 134 with the stiffening member 104 is such to mitigate against the rivet nut 128 from dislodging from the aperture 110 and causing at least a partial detachment of the belt 112 from the skeleton 102. Additionally, it should also be understood that the rivet nut 128 and the fastener 138 can be other types of cooperating fasteners that enable the rivet nut 128 to receive the fastener 138 without the need to couple the rivet nut 128 with an assembly tool or one's fingers.

In the illustrated embodiment, the belt 112 is made from polyvinyl chloride (PVC). It should be understood that other materials can be used for the belt 112 as desired and as needed to satisfy specific design, manufacturing, and application requirements, including, but not limited to, fabrics and woven materials including natural and synthetic fibers and yarns, and other elastomeric and synthetic materials including extruded and calendared materials. It should also be understood that a surface of the belt 112 can be textured or dimpled, provided with a coating to improve the performance of the belt, and include words or numerals painted or printed thereon providing sizing information, operational information, safety information, and the like.

In use, the combination conveyor belt 100 forms a loop that can be disposed on a rail system and sprockets and driven in an endless loop to provide the conveying movement to the combination conveyor belt 100. The items can be deposited on the belt 112 as it moves and then conveyed to the desired location where the items can be offloaded, dumped, or transferred to another conveyor as desired.

The fastener system 114 can provide for a secure attachment of the belt 112 to the stiffening members 104 which mitigate against the belt 112 braking and detaching from the stiffening members 104. Additionally, the washer 136 and fastener 138 cooperate to mitigate against a head of the fastener 138 from pulling through the belt 112. Additionally, the fastener system 114 can provide for a secure attachment of the stiffening members 104 to the protrusions of the chains 120, 122. Utilizing the combination conveyor belt 100 can provide improved performance and more efficient operations in challenging service conditions and for conveying items that are heavy, large, or have other characteristics that make conveying the items difficult and can lead to reduced service life and increased maintenance requirements for other conveyors.

Figure 16:
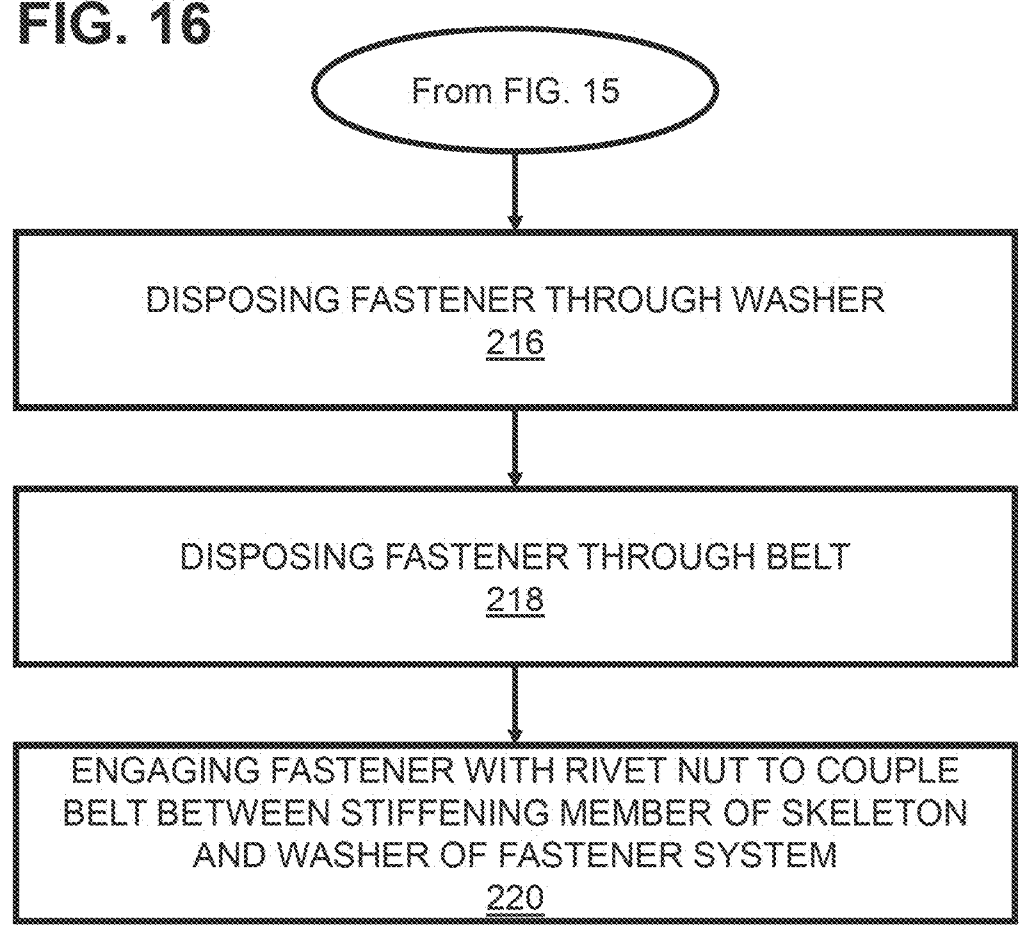
FIG. 16 is a flow chart continuing from FIG. 14 and further illustrating the method of manufacturing the combination conveyor belt, according to one embodiment of the present disclosure.

With reference to FIGS. 15 and 16, the present disclosure further contemplates the method 200 for manufacturing the combination conveyor belt 100, as described hereinabove. In a step 202, the method 200 can include providing the skeleton 102 including the stiffening member 104 having the upper surface 106 and the aperture 110 in the upper surface 106.

In a step 204, the method 200 can include providing the belt 112. A step 206 of the method 200 can include providing the fastener system 114 to couple the belt to the skeleton 102. In a step 208, the method 200 can include coupling the belt 112 to the skeleton 102 using the fastener system 114. Additionally, the method can include coupling the stiffening member 104 to the protrusions 121 of the chains 120, 122. In some embodiments, the method 200 can further include a step 210 of providing a fastener system 114 that can include a rivet nut 128, a washer 136, and a fastener 138. It should also be appreciated that the fastener system 114 does not include the washer 136.

It should be appreciated that the method 200 can include a step of receiving the rivet nut 128 into the aperture 110 of the stiffening member 104 or the protrusion 121 in a step 212. The rivet nut 128 can be deformed in a step 214 to couple the rivet nut 128 to the stiffening member 104 or the protrusion 121. The rivet nut 128 can be inserted into the aperture 110 using a tool 148 to efficiently preinstall the required number of the rivet nuts 128 in the stiffening members 104 and the protrusions 121 of the skeleton 102 as shown in FIGS. 8 and 13.

In the method 200, the fastener 138 can be disposed through the washer 136 in a step 216 and then the fastener 138 can be disposed through the hole 146 in the belt 112 in a step 218. In a step 220, the fastener 138 can be engaged with the rivet nut 128 to a desired torque to couple the belt 112 to the stiffening members 104 of the skeleton 102 by securing the belt between the lip 132 of the rivet nut 128 and the washer 136 of the fastener system 114. It should be appreciated that in certain embodiments not including the washer 136, the fastener 138 can be disposed through the hole 146 in the belt 112 and engaged with the rivet nut 128 to a desired torque to couple the belt 112 to the stiffening members 104. Alternatively, the fastener 138 can be disposed through the washer 136, the hole 146 in the belt 112, and the fastener hole 123 of the stiffening member 104 and then the fastener 138 can be engaged with the rivet nut 128 to a desired torque to couple the stiffening members 104 to the protrusions 121 of the skeleton 102. It should be appreciated that in certain embodiments, the fastener 138 can be disposed through the fastener hole 123 of the stiffening member 104 and then the fastener 138 can be engaged with the rivet nut 128 to a desired torque to couple the stiffening members 104 to the protrusions 121 of the skeleton 102, in such an embodiment fastener does not pass through the belt and/or and the washer.

The present disclosure further contemplates a kit (not shown) for a combination conveyor belt 100. The kit can include a skeleton 102 including a plurality of stiffening members 104 each having an upper surface 106 and a plurality of apertures 110 formed in the upper surface 106. The kit can further include a first chain 120 and a second chain 122 spaced apart from and substantially parallel to the first chain 120 where the stiffening members 104 can be placed between the first chain 120 and the second chain 122 substantially perpendicular to the first chain 120 and the second chain 122 and the first end 116 and the second end 118 of the stiffening members 104 can be coupled to the first chain 120 and the second chain 122.

The kit can further include a belt 112 that can be disposed on the upper surface 106 of each stiffening member 104. The belt 112 can include a plurality of holes 146 formed corresponding to the plurality of apertures 110 of each stiffening member 104. The kit can further include a plurality of fastener systems 114. Each fastener system 114 can include a rivet nut 128, a washer 136, and a fastener 138. Each fastener system 114 of the plurality of fastener systems can be configured to have the rivet nut 128 received in one aperture 110 of the stiffening member 104 and deformed. The fastener 138 can be disposed through the washer 136 and engage the rivet nut 128, thereby coupling the belt 112 to the stiffening member 104 with the belt 112 disposed between the washer 136 and the stiffening member 104.

The kit can additionally include optional components and accessories to enhance the functionality and versatility of the combination conveyor belt 100. These may include wear pads 124 that can be configured to protect the stiffening members 104 from excessive wear due to friction and impact. The wear pads 124 can be made from steel. Furthermore, the kit may include additional tools or components such as adhesives or joint dressings to facilitate the insertion and retention of the rivet nuts 128 in the apertures 110, and a tool 148 for efficiently preinstalling the required number of rivet nuts 128 in the stiffening members 104 of the skeleton 102. The kit for the combination conveyor belt 100 may further be provided with detailed assembly and usage instructions.

Advantageously, the present technology provides an innovative solution to the challenges faced in conveyor belt design by offering a combination conveyor belt with improved service life, reduced maintenance requirements, and reduced cost of manufacturing for a given application. The disclosure addresses these issues through a secure attachment mechanism for the belt to the skeleton or pivoting framework, utilizing a fastener system that includes a rivet nut, a washer, and a fastener. This fastener system minimizes the need to hold the rivet nut with an assembly tool or one's fingers during installation, streamlining the manufacturing process. In operation, it should be appreciated that during assembly or a maintenance operation the fastening system can eliminate the need for a person from reaching into the skeleton assembly or laying down beneath the combination conveyor to hold the rivet nut with an assembly tool or one's fingers. Furthermore, the design incorporates features such as an interference fit for the rivet nut and a deformable structure that creates opposing lips, ensuring a robust connection that mitigates against belt detachment and rotation of the rivet nut during operation. These improvements collectively contribute to a more durable, efficient, and cost-effective conveyor belt system that can better withstand challenging service conditions and handle heavy or large items that typically lead to reduced service life and increased maintenance in conventional conveyor designs.

EXAMPLE

An example embodiment of the present technology is provided with reference to the several figures enclosed herewith.

Example: Conveyor Belt with Steel Tubing Stiffening Members

In this example, a combination conveyor belt is constructed using stiffening members made from steel tubing with a substantially square-shaped cross-section. These stiffening members are arranged between a first chain and a second chain, with the first end of each stiffening member coupled to a protrusion of the first chain and the second end coupled to a protrusion of the second chain.

The stiffening members include apertures with a hexagonal cross-section formed in their upper surfaces. A belt made of polyvinyl chloride (PVC) is disposed on top of the stiffening members. The belt has holes that align with the apertures in the stiffening members.

To secure the belt to the stiffening members, a fastener system is employed. This system consists of hexagonal rivet nuts, washers, and fasteners. The rivet nuts are inserted into the apertures of the stiffening members and the protrusions of the chains with an interference fit and then deformed to create opposing lips that secure them in place. The fasteners are then inserted through the washers and the holes in the belt, engaging with the rivet nuts to couple the belt to the stiffening members and to couple the ends of the stiffening members to the protrusions of the chains.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A fastener system for a combination conveyor belt including a skeleton, the fastener system comprising:

a rivet nut having a lip, an opposing lip, an exterior, and a threaded through hole, the rivet nut received in an aperture formed in the skeleton, the lip and the opposing lip in frictional contact with the skeleton, and the opposing lip formed upon a deformation of the rivet nut after the rivet nut is received in the aperture to couple the rivet nut to the skeleton; and a fastener threadably received in the threaded through hole of the rivet nut coupled to the skeleton to secure one component of the combination conveyor belt to another component of the combination conveyor belt.

2. The fastener system for the combination conveyor belt of claim 1, further comprising a washer disposed on and abutting the fastener.

3. The fastener system for the combination conveyor belt of claim 1, wherein the rivet nut has a hexagonal cross-section and the aperture of the skeleton has a hexagonal shape to minimize a rotation of the rivet nut with respect to the skeleton.

4. The fastener system for the combination conveyor belt of claim 1, wherein the rivet nut is in frictional contact with the skeleton to minimize a rotation of the rivet nut with respect to the skeleton.

5. The fastener system for the combination conveyor belt of claim 1, wherein the one component is a belt and the other component is a stiffening member of the skeleton, and the rivet nut is coupled to the stiffening member.

6. The fastener system for the combination conveyor belt of claim 1, wherein the one component is a stiffening member having a fastener hole and the other component is a protrusion formed on a chain of the skeleton, and the rivet nut is coupled to the protrusion.

7. A combination conveyor belt comprising:

a skeleton including a plurality of stiffening members, each stiffening member of the plurality of stiffening members having an upper surface, and a plurality of apertures formed in the upper surface, a first end and a second end, and each stiffening member of the plurality of stiffening members is disposed between a first chain and a second chain, the first end of each stiffening member is coupled to the first chain, and the second end of each stiffening member is coupled to the second chain;

a belt disposed on the upper surface of the stiffening member of the skeleton, the belt having a hole formed therein, the belt including a first end and a second end, the first end overlapping the second end to form a belt splice; and a fastener system cooperating with one the plurality of apertures and the hole to couple the belt to the stiffening member, wherein the fastener system includes a plurality of fastener systems, each of the plurality of fastener systems including a rivet nut and a fastener.

8. The combination conveyor belt of claim 7 wherein the rivet nut includes a lip, an opposing lip, an exterior, and a threaded through hole, the rivet nut received in the aperture formed in the stiffening member, the lip and the opposing lip in frictional contact with the stiffening member, and the opposing lip formed upon a deformation of the rivet nut after the rivet nut is received in the aperture to couple the rivet nut to the stiffening member.

9. The combination conveyor belt of claim 7, wherein the stiffening member includes a wear pad.

10. The combination conveyor belt of claim 7, wherein the aperture includes a hexagonal cross-section.

11. The combination conveyor belt of claim 7, wherein the rivet nut includes a hexagonal cross-section.

12. The combination conveyor belt of claim 7, wherein the rivet nut is configured to have an interference fit with the aperture formed in the upper surface of the stiffening member.

13. The combination conveyor belt of claim 7, wherein the fastener system includes a washer, the fastener is disposed through the washer and engages the rivet nut, thereby coupling the belt to the stiffening member with the belt disposed between the washer and the stiffening member.

14. The combination conveyor belt of claim 7, wherein the fastener system includes a washer, the belt splice is located at the stiffening member and the fastener is inserted through the washer, the first end of the belt, and the second end of the belt to engage the rivet nut to secure the belt splice between the stiffening member of the skeleton and the washer.

15. The combination conveyor belt of claim 7, wherein the belt is comprised by a plurality of holes.

16. The combination conveyor belt of claim 15, wherein each hole of the plurality of holes is configured to be aligned with a corresponding aperture of the plurality of apertures.

17. The combination conveyor belt of claim 7, wherein the first chain and the second chain include a plurality of protrusions, each one of the plurality of protrusions includes an aperture, and each one of the plurality of stiffening members includes a fastener opening, wherein the plurality of fastener systems are configured to cooperate with the apertures of the protrusions and the fastener openings of the stiffening members to facilitate coupling each one of the plurality of stiffening members to the first chain and the second chain.

18. A method of manufacturing a combination conveyor belt, comprising:

coupling a belt to a skeleton using a fastener system, wherein the skeleton includes a stiffening member having an upper surface and an aperture formed in the upper surface;

the belt is disposed on the upper surface of the stiffening member of the skeleton, the belt having a hole formed therein; and the fastener system cooperates with the aperture and the hole to couple the belt to the stiffening member, wherein the fastener system includes a rivet nut, a washer, and a fastener, and coupling the belt to the skeleton using the fastener system includes where the rivet nut is received in the aperture of the stiffening member and deformed.

19. The method of claim 18, wherein the fastener is disposed through the washer and engages the rivet nut, thereby coupling the belt to the stiffening member with the belt disposed between the washer and the stiffening member.

* * * * *